INVENTORS
BO INGEMAR ANDERBERG
SVEN HARALD CLAESSON

BY Larson and Taylor

ATTORNEYS

May 31, 1966 B. I. ANDERBERG ET AL 3,253,973
APPARATUS FOR MAKING PIPE INSULATING SHELLS FROM MINERAL WOOL
Filed Jan. 22, 1962 13 Sheets-Sheet 3

INVENTORS
BO INGEMAR ANDERBERG
SVEN HARALD CLAESSON

BY Larson and Taylor

ATTORNEYS

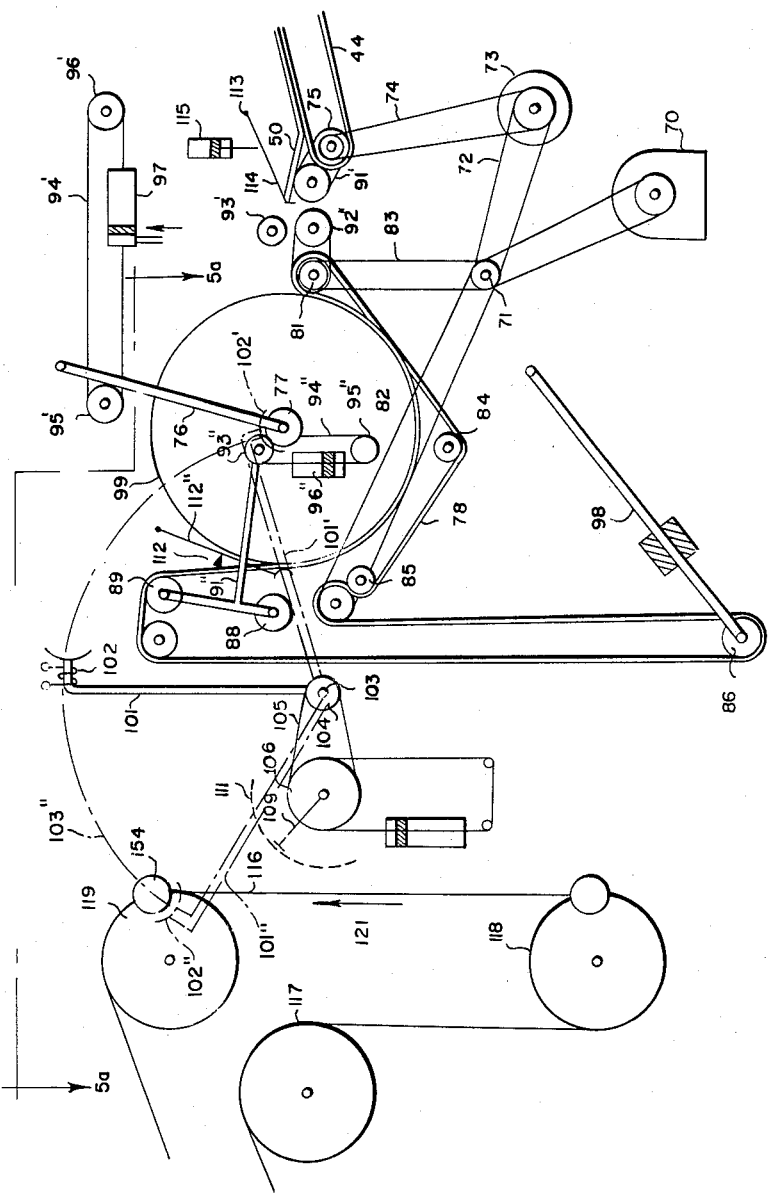

INVENTORS
BO INGEMAR ANDERBERG
SVEN HARALD CLAESSON

ATTORNEYS

May 31, 1966  B. I. ANDERBERG ET AL  3,253,973
APPARATUS FOR MAKING PIPE INSULATING SHELLS FROM MINERAL WOOL
Filed Jan. 22, 1962  13 Sheets-Sheet 6

INVENTORS
BO INGEMAR ANDERBERG
SVEN HARALD CLAESSON

BY *Larson and Taylor*

ATTORNEYS

INVENTORS
BO INGEMAR ANDERBERG
SVEN HARALD CLAESSON

BY Larson and Taylor

ATTORNEYS

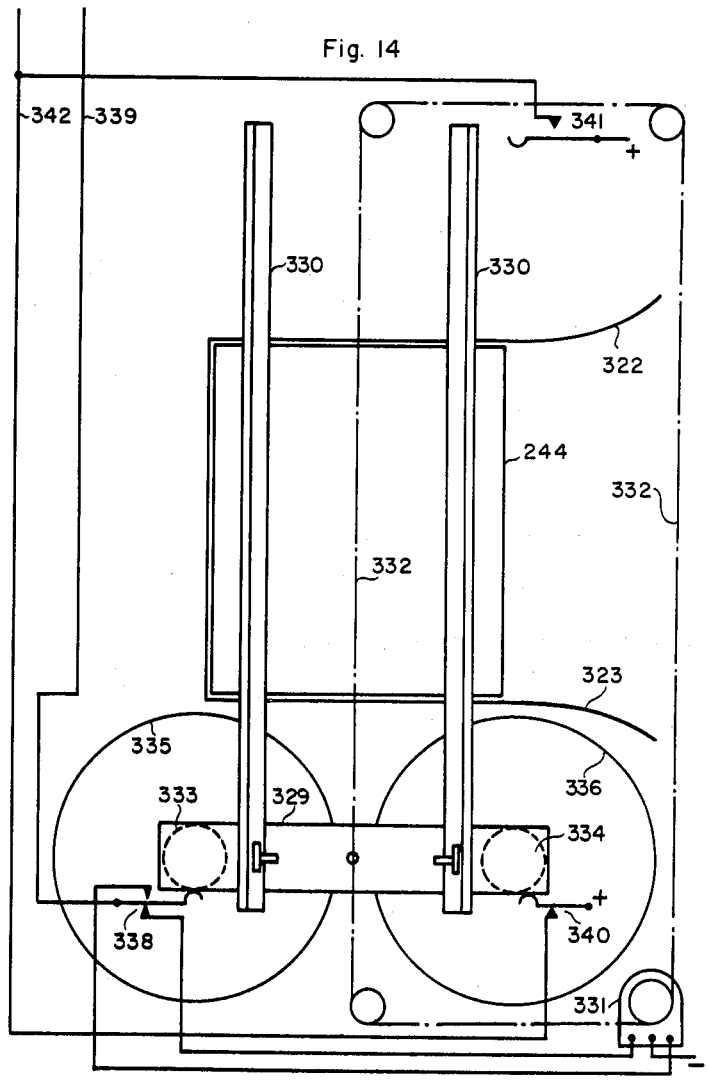

United States Patent Office 3,253,973
Patented May 31, 1966

3,253,973
APPARATUS FOR MAKING PIPE INSULATING
SHELLS FROM MINERAL WOOL
Bo I. Anderberg and Sven H. Claesson, Skovde, Sweden,
assignors to Rockwool Aktiebolaget, Skovde, Sweden,
a corporation of Sweden
Filed Jan. 22, 1962, Ser. No. 167,879
Claims priority, application Sweden, Jan. 30, 1961,
919/61
11 Claims. (Cl. 156—378)

Herefore it has been customary to insulate pipe conduits carrying hot fluids, gases or the like, by means of a thermal insulation material, for instance cotton or the like, packed around the piping and thereafter provided with a bandage. This method, in practice, has proved to be expensive as to both labor and materials, and in spite of the expense the insulation property has often been less than was intended, because everything is dependent upon the accuracy of applying the insulation, and as it is very difficult afterwards to check how the work has been done. The need for supervision in such insulation methods has therefore been great.

Toward making possible a less expensive mounting and a better insulation, it has been proposed to produce so called pipe shells, which are ready-made pieces of insulation in adapted lengths, fully enclosing or corresponding to given sectors of the circumference of the pipe, for instance 180° or 120°, whereby the pipe shells can be readily produced for immediate mounting, can be made of a cheaper material and can be checked easily both by the manufacturer and by the consumer, for instance, regarding their specific weights and dimensions. Mineral wool has been used for the production of such pipe shells.

The present invention relates to a fully automatic method for the production of pipe shells, as well as the apparatus required for carrying out the method.

According to the method of the present invention, mineral wool is fed in the form of a thin mat, the wool having been previously impregnated with a solution of a non-cured curing plastic, to a roller device where the mineral wool mat is rolled on a mandrel until it has acquired a given thickness. The given thickness is sensed by an electrical device, which is influenced by a pivoted arm the free end of which rests on the periphery of the shell on the mandrel, moves toward an electrical contact as the thickness of the mineral wool on the mandrel increases, and closes the contact to give an electrical impulse when the predetermined thickness has been obtained. As a consequence of the contact being closed the mineral wool mat is torn off to stop feeding of wool onto the rolling mandrel, the mandrel with the mineral wool mat rolled up thereon is transferred to a conveyor for further, intermittent operations, and a new mandrel is transferred to the roller device, whereafter the rolling procedure is repeated.

A series of conveyors then intermittently and synchronously transfer loaded mandrels, that is, the mandrels having the mineral wool mats rolled up thereon in succession, to the subsequent working stations including a curing device, where the loaded mandrels are cured, through a plurality of stations to a grinding device for grinding the outer cylindrical surface of the mats rolled on the mandrels to provide evenness and concentricity with the mandrel, to an apparatus for cooling the still hot pipe shells and removing grinding residue, and finally to an apparatus for removing the mandrels from the rolled up mats. The mandrels thus removed are transferred to a conveyor band having a movement similar to that of the conveyor band or bands, which carried the full mandrels forwardly in the procedure, on which the mandrels are returned to the place where rolling of a new mineral wool mat on the mandrel takes place. By intermittent and synchronous transfer it is meant that all of the said operations and displacements take place at the same time and in the same intermittent way as the rolling of the mineral wool mat on the mandrel. The finished pipe shell continues, after the mandrel has been drawn out, in the same intermittent way to an apparatus, where it is slit or divided into sectors of 180° or 120°.

The invention will be described further below in connection with the attached drawings, as further details of the invention will be clarified. In the drawings:

FIGS. 3, 4 and 5 show the roller device in three different phases of its operation.

FIGS. 13 and 14 show an end view and a plan view respectively of the apparatus for slitting up the pipe shell or sawing the same in sectors of 180° and 120°.

Mineral wool, especially rock-wool is produced by spinning, and is then collected on a conveyor belt forming a mineral wool mat. The mineral wool has, at some suitable time, for instance during the spinning step, been sprayed with a solution of curing plastic, which will, during curing, cause the binding of the mineral wool fibers into a rigid network. The mineral wool thus produced is wound onto bale cores where it loses its character as a mat to an extent, dictated by the power of the fiber to interlock and by the adherent properties of the curing plastic solution.

Figure 1:
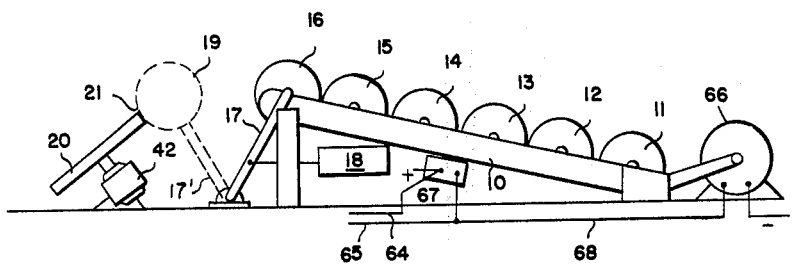
FIG. 1 shows an apparatus for feeding mineral wool to a sawing apparatus for cutting the mineral wool mat.

FIG. 1 shows a conveyor 10, which works in steps, so that one bale of mineral wool can be fed into the lower end, where the bale 11 is situated, as soon as an empty place is created by the conveyor chain carrying forward the bales 11, 12, 13, 14 and 15 one step. The bale 16 is caught by an arm 17, which is manipulated by a servo motor 18, so that the arm is moved from the normal position indicated by 17' into the position 17 for carrying up a new bale as soon as the previous bale has been fully consumed for the production of the mineral wool mat, from which the pipe shells are produced. The last mentioned bale, in FIG. 1, is indicated by dotted lines at 19. The mineral wool mat, from which the pipe shells are to be wound, is cut from the bale by a band saw having an endless saw blade and mounted on two pulley wheels, one of which is designated as rotating around a wheel 20, FIG. 1, as well as around element 20 in FIG. 1 and the other of which is situated behind the wheel 20, and therefore not visible in FIG. 1. The blade will then engage the mineral wool bale at the place 21.

Figure 2:
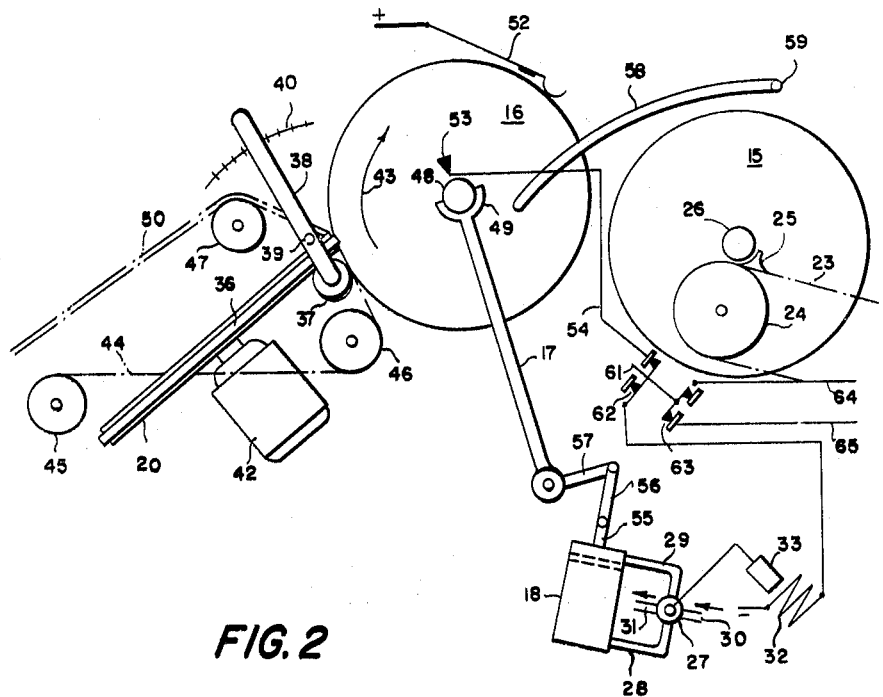
FIG. 2 shows the said sawing appartus in a more complete form.

The arrangement of the saw will be more easily visible in FIG. 2. The conveyor chain 23 of the conveyor 10 runs around a turn-over-roller 24 and is provided with evenly spaced catchers 25 which catch the bale cores 26 and carry them forward each time the conveyor 23 moves one step (one catcher distance) forward.

In FIG. 2 the arm 17 has just brought the bale 16 into sawing position, and as a consequence thereof the bale 15 has moved up into the position formerly occupied by bale 16. An empty place is thereby created, as bale 11 moves forward, and this empty place is filled by a new bale being fed in. The movement of the arm 17 is caused by a pneumatic servo motor 18, controlled by a valve 27, which is connected to the two sides of a piston located within the servo motor 18 by means of conduits 28 and 29. A source of a pressure medium is supplied by means of a conduit 30. Conduit 31 vents to the atmosphere. The valve 27 is arranged to connect, in its one end position, the pressure conduit 30 with the conduit 28 and the conduit 29 with the air-release conduit 31; and in its other end position connect the pressure conduit 30 with the conduit 29 and the conduit 28 with the air-release conduit 31. The valve is controlled by a solenoid with coil 32 and core 33.

The engagement of the saw wheel 20, carrying the saw blade 36, with the bale 16 is controlled by the movement of a roller 37 on which bale 16 rests. Roller 37 is geared one end to a controllable arm 38, pivotable about a pin 39 and controlled by means of a scale 40. When the arm 38 is turned in clockwise direction, the roller 37 is lowered, and by its weight the bale 16 will follow, as a result of which the saw blade cuts deeper into the bale. The saw blade is powered by motor 42.

A conveyor belt 44 of rubber or similar material, which is provided for turning the bale 16 in the direction of the arrow 43 will be described in further detail below in connection with FIGS. 3, 4 and 5. The conveyor belt 44 runs over the rollers 45, 46, 37 and 47. Due to the pressure between the bale 16 and the conveyor belt 44 at the place of contact between the roller 37 and the bale 16, the bale 16 is rotated, together with the bale core 48, in a half gear 49 provided at the free end of the arm 17. As a consequence thereof a mat 50 of desired and constant thickness is cut out from the bale and conveyed to the conveyor belt 44.

During the sawing of the mat 50 from the bale 16, the diameter of bale 16 is decreased, and the arm 17 is lowered and rotated counterclockwise by the weight of the bale 16 and core 48. A contact arm 52 resting on the bale, makes contact with another contact 53, when the bale is empty to close a circuit including line 54 for the coil 32. The coil 32 then draws in its core 33 and reverses the valve 27, so that air is fed to the upper side of the cylinder of the servo motor 18 through the conduit 29; and the lower side of the cylinder of the servo motor is connected with atmosphere through the conduits 28 and 31. The piston with the servo motor 18 is thereby displaced downwardly moving the arm 17 in a clockwise direction by means of guided drag bars 55, 56 and an arm 57. The core 48 is then displaced onto a fork-formed guide arm 58, which encloses it on both sides, so that it will come free of the half bearing 49 and fall down onto a store of bale cores (not shown in the drawing). The guide arm 58 is pivotably mounted on bolt 59. In its clockwise position the arm 17 catches the bale 15. In this end position the arm 17 engages bolt 61, which in turn opens the switch 62 connected into the circuit 54. As a consequence thereof the coil 32 will de-magnetize, and the valve 27 will again be turned to the position shown in FIG. 2, which in turn will cause the servo motor 18 to transfer the arm 17 into the position shown in FIG. 2, thereby carrying the new bale with it and lifting the arm 58. The sawing of a new bale will start immediately after the bale is moved to the sawing position shown in FIG. 2.

When the arm 17 engages the bolt 61, it closes a contact 63 which in turn closes a circuit containing the conductors 64 and 65. These conductors, found in their continuation in FIG. 1, start the driving motor 66 for the belt conveyor 10. The circuit of the driving motor 66 normally runs from the plus terminal over a contact 67, the circuit 68 and the motor 66 to the minus terminal. The contact 67 is resiliently influenced and is normally in its closed position, so that the driving motor is kept running, but it is arranged to be influenced to be opened whenever a recess in the conveyor chain 23 of the conveyor 10 passes the said contact. Said recesses are so spaced on the conveyor, and so displaced, that the circuit is opened and the motor 66 brought to stop, as soon as the uppermost bale on the conveyor 10 is brought to the position of bale 16 in FIG. 1. The contact 67, however, is connected, in parallel to the contact 63 with the consequence, that, as soon as the contact 61 is opened and the arm 17, carrying the uppermost bale from the conveyor 10 starts its counter clockwise movement, the motor 66 will for a short moment receive current, and the open contact 67 will close. Thereafter the motor continues its movement, receiving current over the now closed contact 67, simultaneously as the contact 63 is practically immediately opened, until the next bale is moved into the uppermost position at which time the contact 67 is again opened, and the motor brought to a stop.

Figure 3:
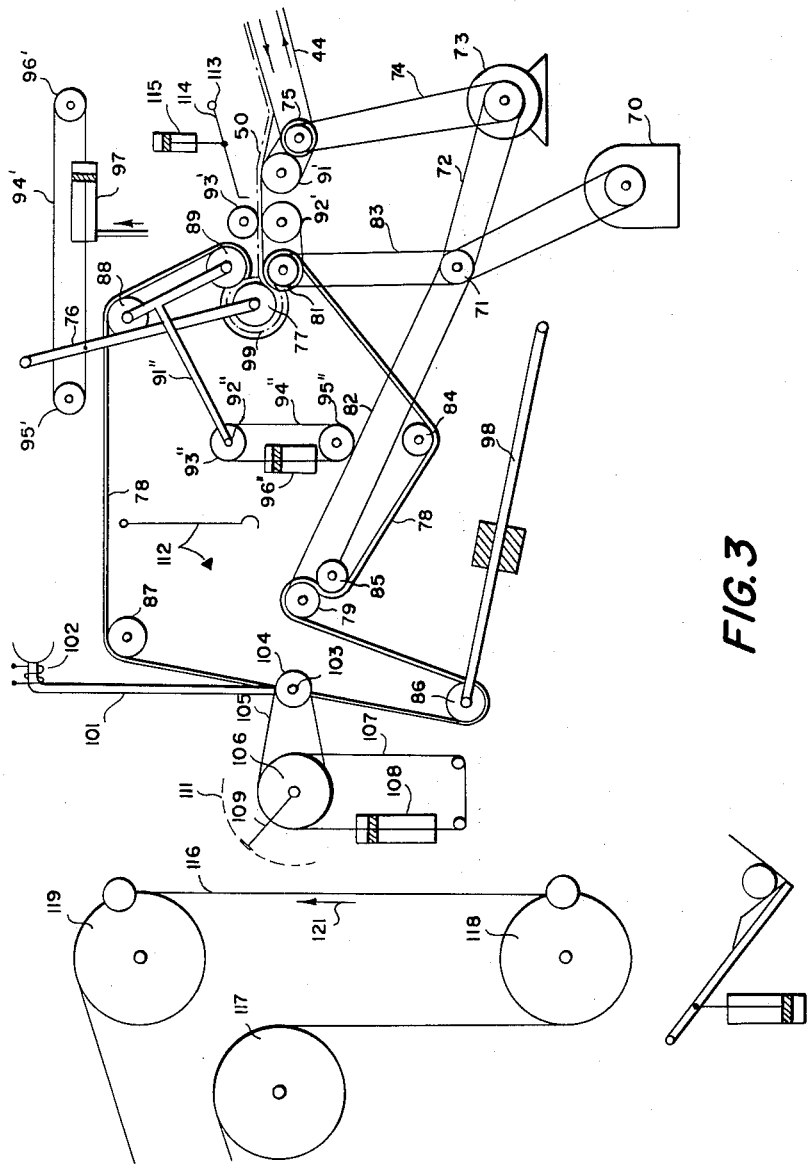
Figure 4:
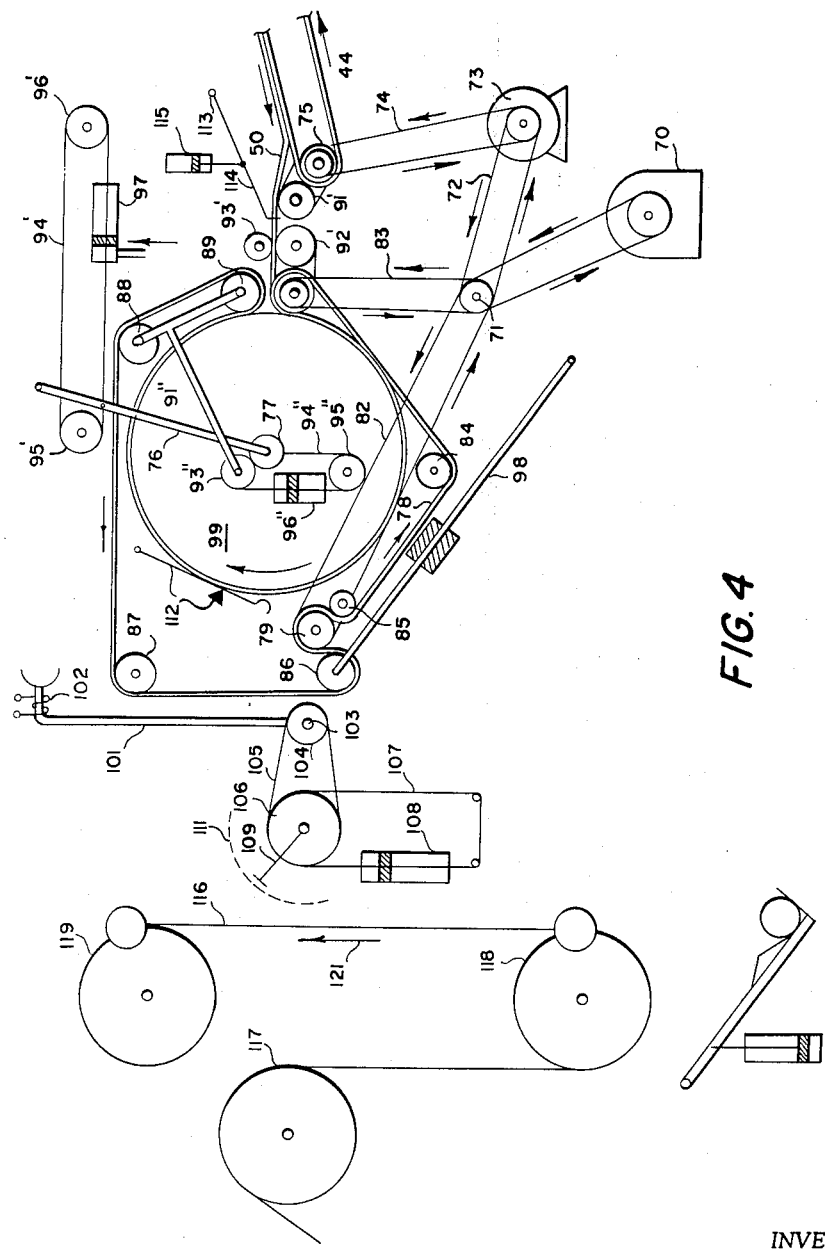

FIGS. 3, 4 and 5 show how the conveyor belt 44 is driven, and how the mineral wool mat 50 is rolled up on the mandrel. The driving force is obtained from a slowly running motor, for instance a cog gear motor 70, which turns a belt disk or pulley wheel, which drives a belt disk shaft 71 having mounted thereon a plurality of belt disks for driving different means. One of the belt disks mounted on the shaft 71 drives the belt 72, which is connected to the in-put shaft of a magnetic coupling 73. The output shaft from this magnetic coupling drives, over the belt 74, a belt disk which is mounted on the roller 75, over which the conveyor belt 44 runs in the direction of the arrows shown at the side of the conveyor belt. Consequently the conveyor belt 44 will move only when the magnetic coupling 73 is engaged.

When the conveyor belt 44 moves, it feeds a sawed-out mat 50 of mineral wool to the winding apparatus. The winding apparatus includes essentially the following parts: a holder for a mandrel 77, mounted on oscillatable arm 76, the sawed mineral wool 50 being wound up over said mandrel into a pipe shell, and a winding mechanism, including an endless belt 78, for instance of rubber, which runs over a number of directional rollers. Directional rollers 79 and 81 for the belt are driven by means of belts 82 and 83 from belt disks which are mounted on the common belt disk shaft 71. In addition to the two driving rollers 79 and 81 there are three idler rollers 84, 85 and 87 having fixed axes, one weight-loaded roller 86, and finally two rollers 88 and 89 having movable axes. The rollers 88 and 89 are arranged at each end of the upper piece of a T-formed arm 91", which is rotatable about the shaft 92". On the same shaft 92" a wire disk 93" is mounted with an endless wire 94" which runs over another wire disk 95" and carries a piston of a pneumatic servo motor 96".

In the operation of the winding apparatus it is assumed that the motor 70 is running, that the magnetic coupling 73 is engaged, and finally that a mandrel 77 is situated as shown in FIG. 3. Due to the movement of the conveyor belt 44 a sawing action of the mineral wool mat 50 will take place, and the mat will be carried by the conveyor belt 44 to a feeder device, consisting of the rollers 91', 92', and 93', the roller 91' being driven from the roller 75 and the roller 92' being driven from the roller 81. The roller 93' is an idle roller and rests by gravity on the mat 50 and thereby on the roller 92'. The mat 50 thereafter runs on over the driving roller 81 and the rubber belt 78 running thereon. Thereafter the mineral wool mat is pressed into the slot between the mandrel 77 and the rubber mat 78. In this way the mat is rolled up around the mandrel. A given pressure is applied to the roller of the mineral wool mat by placing the arms 76 under pneumatic pressure. The arrangement for applying the pneumatic pressure includes a wire 94', which runs over two rollers 95' and 96', and is attached to both the arm 76 and a piston in a pneumatic pressure cylinder 97. The pressure is applied in cylinder 97 against the piston in a direction which will cause the arm 76 to turn in a counter clockwise direction.

The arm 98, on which the roller 86 is mounted, serves as a spanner device for the endless rubber belt 78. For this purpose a movable counter weight is provided on the arm 98, by the displacement of which on the arm 98 a suitable tension is obtained in the endless rubber belt 78.

During the operation of the winding apparatus, the amount of wool mat wound upon the mandrel 77 will continually increase until it reaches a predetermined magnitude at which the continuous winding of mineral wool is interrupted, and the pipe shell thus formed together with the mandrel on which the wool is wound is removed, and a new mandrel brought into working position according to FIG. 4. The fully loaded mandrel is shown in FIG. 4 just prior to its removal from the winding station.

For removal of the ready-wound pipe shell 99 there is provided an arm 101 with a magnetically controlled catcher device 102. The arm 101 is rotatably mounted on a shaft 103, on which a wire disk 104 is also mounted, said wire disk being driven from a wire disk 106 by means of the rigidly connected wire 105. A second rigidly connected endless wire 107 on disc 106 is connected to a piston in a pneumatic servo motor 108. Also secured to the wire disk 106 is a contact arm 109 which moves over a series of contact segments 111 for a purpose, which will be evident from the following specification. Further a sensing device in the form of an electrical contact 112 is arranged to be closed when the pipe shell 99 has been wound to a predetermined thickness, or radius.

Figure 5A:
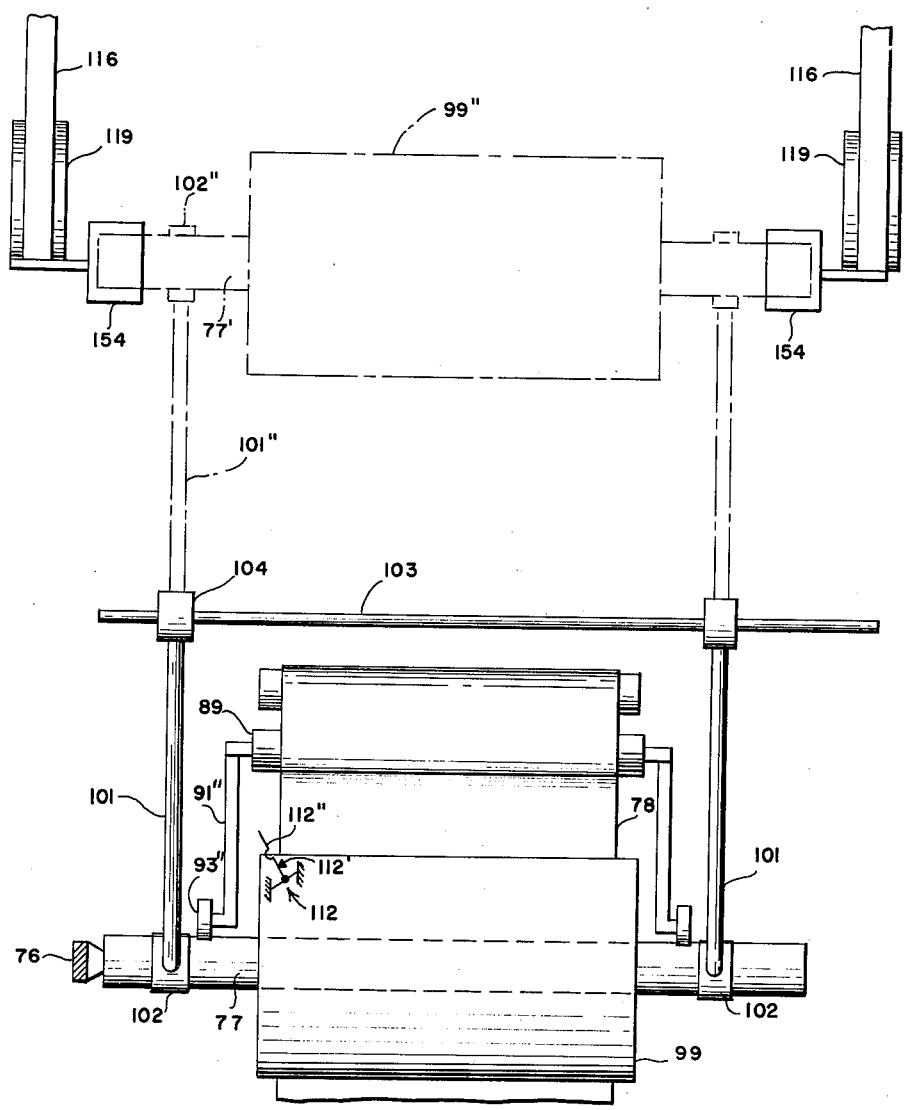
FIG. 5A is a partial section taken along line 5A—5A in FIG. 5 but showing the arm 101 in a downward position impinging upon mandrel 77 rather than in its position of rest as shown in FIG. 5.

As shown in FIGS. 5 and 5A a sensing element which is an electrical contact or switch 112 includes a fixed electrical contact 112' and a pivotally movable contact 112". The upper end of arm 112" is pivotally mounted to a cross arm which is fixed with respect to the winding apparatus. The lower end of arm 112 engages the edge of the mineral wool pipe shell and is urged outwardly, towards the fixed contact 112' as the pipe shell 99 increases in thickness. The location of fixed contact 112' with respect to movable contact 112" will determine the thickness to which the pipe shell must be wound before the electrical contact 112 closes.

When the electrical contact or switch 112 closes, thereby sensing that the winding of the pipe shell 99 should be stopped, a series of steps commence. Firstly the feeding of further mineral wool mat 50 is prevented by means of a teeth-provided arm 114 rotatable about pivot 113. The precise electrical pneumatic system which causes movement of the teeth-arm 114 in response to the closing of switch 112 is discussed below with reference to FIGURE 6. Downward displacement of arm 114 by a pneumatic servo motor causes the teeth on the arm to enter into the mineral wool mat 50 thereby acting as a cutting means, severing the mineral wool mat 50 causing it to be torn off along the line of the teeth of 114. This mechanism assures that the cut will always be at a distinct place (at teeth-arm 114) and in a direction perpendicular to the direction of movement of the mat. Secondly, the magnetic coupling 73 should be de-magnetized, so that it is released by its spring force, and the conveyor belt 44 stopped. This will also stop the sawing, although the motor 42 and the saw blade 36 will continue to move. Thirdly, the catcher arm 101 by influence from the pneumatic servo motor 108, is turned in a clockwise direction until catcher device 102 closes around the protruding end of the mandrel 77. A current is then transmitted through the magnet winding of the catcher device, so that the arm 101, on its return stroke, magnetically attracts and carries away a ready-wound pipe shell 99 together with the mandrel 77. To clear the path for the pipe shell and mandrel the two spanner rollers 88 and 89 must be moved from their positions as shown in FIG. 3. This removal of 88 and 89 takes place under influence of the pneumatic servo motor 96", the endless rubber belt 78 simultaneously being kept spanned by influence from the spanner roller 86 provided on the arm 98. Following the removal of rollers 88 and 89 the direction of pressure in the servo motor 108 is reversed, so that arm 101 by its magnetic grip on the protruding ends of the mandrel 77 carries away the ready-wound pipe shell which is wound on mandrel 77 together with the mandrel 77, and places it on a double conveyor chain 116 provided with catchers 154 which are shown in part in FIG. 5 running over the three wheels 117, 118 and 119 in the direction of the arrow 121. This is accomplished by placing the catchers in the path of the mandrel 77, when the mandrel, held by the magnetic catcher device, is carried in the counter clockwise direction by the arm 101. After the mandrel engages the catchers, it is retained there, and therefore freed by mechanical force from the magnetic catcher means 102 as the arm 101 continues its counter clockwise movement past the catchers.

The movement of the arm 101 and the catchers 102 are shown in detail in FIGS. 5 and 5A. In FIG. 5 the arm 101 is shown in dotted lines as 101' at the position where it impinges upon the protruding end of mandrel 77. While the catcher 102 is holding the mandrel, magnetically, in this position, the needle bearing at the lower end of arm 76 is disengaged from a hollow end of the mandrel so that the mandrel (with the pipe shell wound thereon) is supported solely by the magnetic catcher 102. The arm 101 (or, 101' as shown in FIGS. 5 and 5A) is then caused to rotate in a counter clockwise direction over to the position 101" as shown in FIGS. 5 and 5A. There the mandrel ends outside of the points contacted by catcher 154 full within catchers 154 which are opened at the top to receive the descending mandrels 77 but closed at the bottom to retain the mandrels 77 as the arm 101" continues on its downward movement where it will receive a new empty mandrel.

FIG. 5A shows more clearly the relative position of the pipe shell 99 wound upon mandrel 77 as well as the operation of the arms 101 and the catchers 102. Here it can be seen that the pipe shells are wound upon the mandrels 77 which extend completely through the pipe shell and protrude at both ends. The mandrel is held in place during wind by a bearing located at the lower end of arm 76. When the catchers impinge upon the mandrel as shown in FIG. 5A, and current is sent through the windings around catcher 102 making it magnetic, the arm 76 may be moved out of the mandrel. The arms 101 then pick the mandrel up and swing it over to the position shown in dotted lines. There the mandrel, shown as 77' is placed onto the double chain conveyor 116 by placing the extreme ends of the mandrel 77' into catchers 154 which are fixed on the conveyor 116.

The counter clockwise motion continues until arm 101 passes by a new, empty mandrel, which is fed forward when the conveyor chain 116 has moved one catcher distance in the direction of the arrow 121 to the position, where the mandrel 77 was just freed from the arm 101.

The arm 101 now changes its direction turning clockwise to catch the new empty mandrel which has moved to the place where the mandrel with mineral wool mat wound thereon was removed. Here the magnetic catcher device 102 on the arm 101 will take up the new empty mandrel and carry it in the clockwise direction. As soon as the new empty mandrel, carried by arm 101, arrives at the position of the mandrel 77 as in FIGS. 4 and 5, the needle bearings in the end of the arm 76 will engage and retain the mandrel, current to the magnetic catcher arrangement 102 will be cut off, and the arm 101 will then return to its position of rest, as shown in FIGS. 3, 4 and 5. Thereafter the teeth-arm 114 moves up from the mineral wool mat, and the magnetic coupling 73 is again engaged, so that the conveyor belt 44 is again put in movement.

Thus, a series of rather complicated movements are executed in a carefully adapted sequence. FIGS. 4 and 5 show positions of the winding apparatus other than that shown in FIG. 3.

Figure 6:
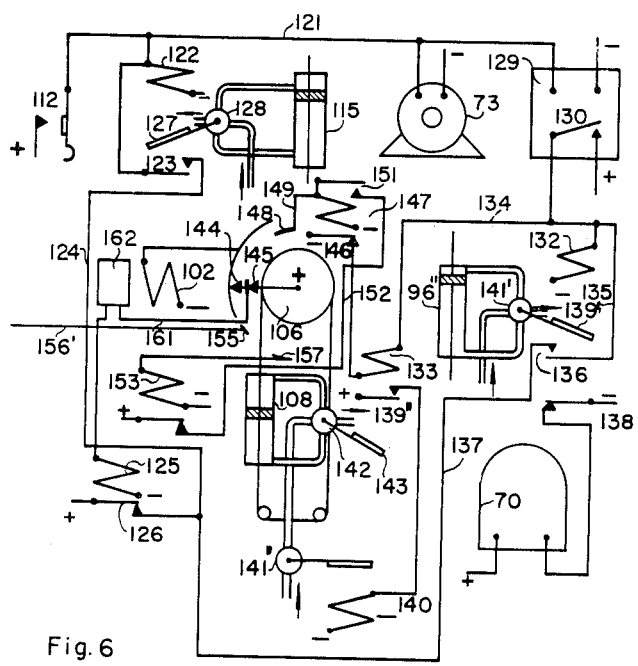
FIG. 6 shows a wiring diagram for the electrical and pneumatic connections for controlling the operation of the roller device.

FIG. 6 shows an electrical and pneumatic wiring diagram showing the controls for the operation of the winding apparatus. The impulse for starting all of this procedure is given from the contact 112. Contact 112 will in that way control, directly or indirectly, all of the intermittent operations of the winding apparatus cycle. Briefly, the contact 112 gives the electrical impulse for the time determined working procedure of all of the winding apparatus with the exception of the feeding of a new bale after the one shown as 16 in FIG. 1, has been consumed.

Due to the time between the consumption of one bale and the feeding of a new bale, an interruption may occur in the mineral wool mat 50. During all of this time, however, the winding apparatus according to FIGS. 3, 4 and 5 will turn, but no further mineral wool will be added to the pipe shell. Thus, the interruption in the wool feed has no decisive importance since the impulse for the mandrel changing operation in the winding apparatus is not determined by a timer but is exclusively dependent upon the increase in thickness of the pipe shell produced from the mineral wool. It is thus ensured that the machine will complete its work in the most effective possible way, maintaining a sufficiently exact outer diameter of the mineral wool pipe shells removed from the winding apparatus. As mentioned earlier, the mineral wool is sticky at this stage, and therefore tends to felt itself together, so that the joint between two pieces of the mineral wool mat will scarcely be observable.

FIG. 4 shows all of the parts shown in FIG. 3. However FIG. 4 shows a fully wound mandrel. Here the pipe shell 99 has been wound to such a thickness that by its contact with the switch 112 causes the switch 112 to close. As the pipe shell 99 increases in diameter the arm 76 is increasingly displaced in a clockwise direction against the action of the pneumatic pressure in the device 97. In a manner that will be discussed in greater detail below with reference to FIG. 6, the closing of contact 112 will cause the servo motor 115 to activate as the magnetic coupling 73 is released. Servo motor 115 causes the teeth-arm 114 to be lowered down into the mineral wool mat 50, which is thereby torn off during the continuous movement of the rubber belt 78. When the magnetic coupling is released, the belt 74 and the conveyor path 44 will stop, and even though the saw blade 36, see FIG. 2, will continue working, no more material will be fed to said saw blade. The formation of further mineral wool mat at the sawing device as well as the conveying of such further mineral wool mat is thus stopped.

In this state, however, the rubber belt 78, will continue to turn a few turns of the mandrel 77. The purpose of this is to smooth out the outer surface of the formed mineral wool pipe shell 99, especially at the place where the fed mineral wool mat ends.

Until this moment, the arrangement therefore remains in the state, shown in FIG. 4. The arm 101 thus is still in its position of rest, and the chain 116 is at a stand-still.

As mentioned above, one will find the pneumatic electrical wiring diagram in FIG 6. From the parts already mentioned one will here find the switch 112, the coil of catcher 102 of the magnet, which retains the mandrel of a fully wound mineral wool pipe shell in the catcher means of the arm 101, the motor 70, the magnet coupling 73 and the pneumatic servo motors 96″, 108 and 115. The operation of the apparatus is best understood by a description of its action in transferring from the arrangement or stage shown in FIG. 4 to the stage shown in FIG. 5.

When the switch 112 is closed, the plus terminal of the main line is connected over this switch to a conductor 121. With this conductor the winding of a relay 122 is connected. Its other terminal is connected to the minus terminal of the main, so that the relay 122 will immediately be attracted. The relay thereby closes its contact 123, whereby the plus terminal at the one end of the relay will be maintained, even if the switch 112 opens. This maintenance of the plus terminal is accomplished over the conductor 124, which is connected to the contact 126 of a self-binding release relay 125. The relay 122, however, simultaneously over its armature 127 reverses a valve 128, which controls the position of the servo motor 115, so that a pressure medium is fed to the upper chamber in FIG. 6 of said servo motor, and its piston is displaced downwardly. As can be seen from FIG. 5, this causes the teeth-arm 114 to engage the mineral wool mat to sever it.

By means of the conductor 121, current is also fed to the winding of the magnetic coupling 73. The coupling is spring biased to the power-transfer position, but magnetization of the magnet in the coupling releases this transfer of power by overcoming the spring force. The magnetic coupling, now released, will remain released as long as positive voltage is fed over the conductor 124 from the contact 126 on the self-binding release relay 125. Consequently, also the movement of the conveyor belt 44, see FIG. 5, will stop. Thereby also the function of the saw device stops in the above mentioned way, although the saw blade will still be in movement.

Finally positive voltage is also fed over the conductor 121 to a time-delay device 129. This functions in a way known per se, for instance as a so-called stairway automatic, whereby it will close a contact 130 for a short time after a given time has lapsed from the moment when positive voltage was fed to the time-delay device 129. This period of time is chosen to correspond to two turns of the mineral wood pipe shell 99, now ready-wound, in a manner discussed above.

When the contact 130 is closed, a second series of functions starts. First, two relays 132 and 133 are magnetized by positive voltage over the conductor 134. The relay 132 closes a holding circuit common to both of these relays over the conductor 135, the contact 136, the conductor 137 and the contact 126 on the binding release relay 125. The relays 132 and 133 therefore remain closed, even if the contact 130 should open, until the binding release relay 125 is magnetized.

The magnetization of the relay 132 causes the circuit to the driving motor 70 for the belt 78 to open at the contact 138, thereby freeing the motor of current, so that the motor and the belt 78 both stop. Further, the magnet in the relay 132 attracts its armature 139′ turning a valve 141′ whereby a pressure medium is fed to the upper chamber in the pneumatic servo motor 96″. The piston of the servo motor 96 is thereby displaced downwardly, and by means of the rollers 93″ and 95″ and the wire 94″, see FIG. 5, the arm 91″ is turned to the position shown in FIG. 5. The slack in the belt 78 caused by changing the position of arm 91″ is taken up by spanner roller 86 applied on the arm 98. Access is thereby provided to the ready-wound mineral wool pipe shell, so that it can be removed from the winding apparatus.

The removal of the ready-wound mineral wool pipe shell 99 takes place by the action of the relay 133. This relay obtains current for its magnetization simultaneously with the relay 132, and it also obtains holding current over the conductor 135, the contact 136, the conductor 137 and the contact 126. Upon being magnetized relay 133 connects at the contact 139″ to an auxiliary magnet 140, which causes its armature to open a valve 141", which allows a pressure medium to be fed to the control valve 142 for the servo motor 108. The control valve 142 is simultaneously reversed by means of the action of the magnet of relay 133 on armature 143, so that a pressure medium is fed to the lower chamber in the servo motor 108. Consequently the arm 101 will turn from its position of rest in clockwise direction starting from its vertical position shown in FIG. 5. This movement is transmitted to arm 101 by the wheel 106 which carries a contact arm with two contacts 144 and 145. By means of the contact 144 positive voltage is carried to the coil surrounding catcher 102 so that it will attract the mandrel 77 when the arm 101 has been turned to its outermost position in the clockwise direction and the claw on the catcher 102 embraces the mandrel of the just wound mineral wool pipe shell.

The magnetization circuit of the relay 133 runs over a non-magnetized relay closed contact 146 on a relay 147 to a minus terminal of the main. When the contact arm 101 arrives at its outermost position, where it catches the mandrel of the ready-wound mineral wool pipe shell or sleeve 99, its direction of movement then must reverse in order to remove the shell from the winding apparatus. This movement of 101 commences as contact 145 connects with the contact segment 148, whereby positive voltage from the main is closed over the arm on the roller 106, its contact 145, the contact 145, the contact segment 148 and the conductor 149 to the winding of the relay 147, which is immediately magnetized. The relay 147 then closes a holding circuit through the contact 151, the conductor 152 and a contact on a limit position relay 153. The relay 147 opens its contact 146, whereby the relay 133 is de-magnetized, and the valve 142 is again turned to the position shown in the drawing, in which pressure medium is fed to the upper chamber in the pneumatic servo motor 108, and the arm 101 changes its direction of movement. Thereby, the arm 101 carries the pipe shell 99 through the opening formed by the belt 78 moved aside by the two rollers 88 and 89. During the continuous movement of the arm 101 the catcher 102 passes a pair of hook type catchers 154, see FIG. 5, on the double conveyor chain 116. These catchers function as receivers to retain the mandrel 77 and its shell or sleeve 99 against the action of the magnetization from the coil on the catcher 102, so that the catcher is forced to release the pipe shell and its mandrel as they are thereby received by the hook type catchers 154. The catcher on the arm 101, however, continues its downward or counter clockwise movement until the contact 144 on the arm of the roller 106 contacts a contact segment 155, so that current is fed to the conductor 156'. In a way which will be explained in greater detail below, this causes the conveyor chain 116 to start carrying away the just received mineral wool pipe shell 99, as an empty mandrel is simultaneously carried up into such position to be received by the arm 101 and for subsequent delivery to a position on arm 76 where it will receive a new mineral wool pipe shell, as indicated in FIG. 3.

The arm 101 continues its counter clockwise movement to its bottom position in which the catcher means 102 of the arm 101 is situated below the empty mandrel. At the contact 144 of the arm on wheel 106 current is then closed to a contact segment 157, whereby the relay 153 is magnetized and opens its non-magnetized relay-closed contact. The conductor 152 will thereby be free of current, and the holding of the relay 147 ceases, so that this relay is de-magnetized. Its contact 146 is again closed, and the magnet 133 will obtain current so that a re-setting of the valve 142 will take place. The arm 101 will therefore again move in clockwise direction, carrying with it the empty mandrel.

This movement will continue without interruption until the arm 101 has arrived at its opposite limit position where the mandrel is given off to the arm 76, as shown in FIG. 3, in position for the winding of the next mineral wool pipe shell. In the manner previously discussed the relay 147 is then magnetized and, with a holding circuit, the valve 142 is turned and the arm 101 starts its movement in the counter clockwise direction. When the arm 101 arrives at its position of rest, as shown in FIGS. 3, 4 and 5, current is closed at the contact 145 to the holding release relay 125. It should be observed that the arm 101 passes its position of rest several times during the shell removing operation. First when it carried the ready-wound mineral wool pipe shell counter clockwise to the receiver hooks 154 on the chain 116, then when it carried the empty mandrel in the clockwise direction, and then the third and last time as the arm 101 returns to its rest position. Only every third time should current be given to the relay 125. For this purpose a counting relay circuit 162 of a kind known per se is put into the conductor 161, said counting relay circuit giving voltage to the relay 125 only every third touch. At its magnetization the relay 125 opens at its contact 126 all of the holding circuit. Thus, plus voltage is connected from the conductor 124, and the relay 122 is released. Thereby the teeth arm 114 is lifted up by re-setting of the valve 128 and by means of the servo motor 115. Further, the magnetic coupling is released, and by spring force the magnetic coupling is connected, and the conveyor belt 44 started again. Further the holding circuits are opened over the conductor 137 for the relays 132 and 133. The release of the relay 132 causes the valve 141' to re-set, and the servo motor 96" will thereby transfer both of the rollers 88 and 89 from the positions shown in FIG. 5 to the position shown in FIGS. 3 and 4. When the relay 133 is released, the contact 139" is opened, and the relay 140 is also released. The consequence will be that the feed of pressure medium through the valve 141" is stopped, so that no further movement of the servo motor 108 can take place. The arm 101 is therefore stopped in its rest position, and the complete arrangement has re-assumed the position shown in FIG. 3.

The roller apparatus is now ready to receive and form a new mineral wool pipe shell in the same way as described above. It is thus evident that an intermittent operation of the apparatus is provided, and that the time interval of the intermittent operation is determined exclusively by the time required for a mineral wool pipe shell to be wound up to a given magnitude and to close the switch 112. When this switch is closed the full series of operations will follow automatically in a given order.

It will be evident from the following description that the remaining operations of the apparatus are also under the command of the switch 112, even if in an indirect way, for example by the conductor 156' getting its voltage at the contact 155 which is closed as a consequence of the series of operations started by the closing of the switch 112.

Figure 7:
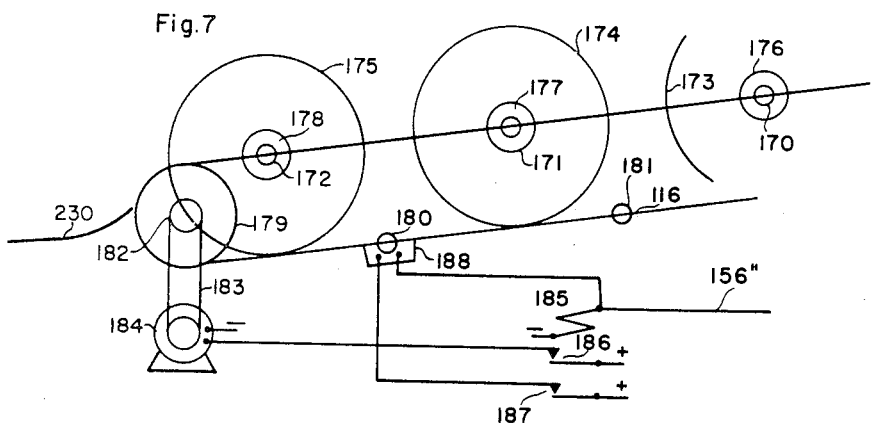
FIG. 7 shows a conveyor arrangement for transferring the mineral wool pipe shells from the roller device to the curing apparatus.
Figure 8:
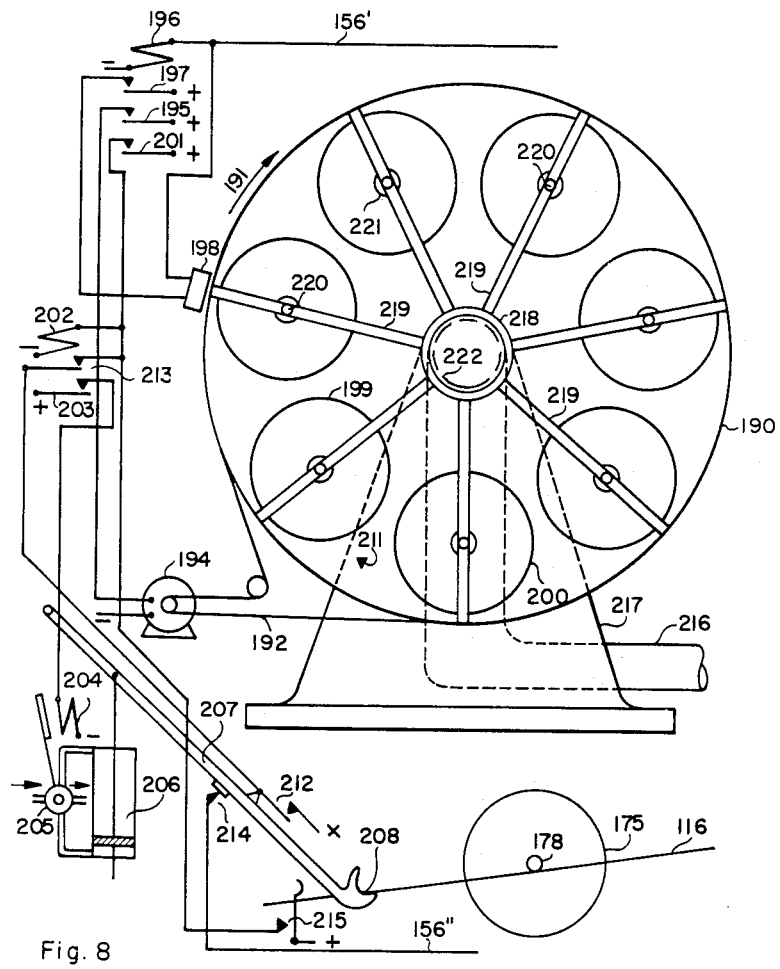
FIG. 8 shows the curing apparatus.

FIG. 7 shows the continuation of the double conveyor chain 116 which carries the ready wound mineral wool pipe shells to the curing station. A number of such mineral wool pipe shells 173, 174 and 175 have been shown hinged to the double conveyor chain 116 by means of catchers 170, 171, and 172. The mandrels are indicated 176, 177, and 178. The pipe shell located at the position of mineral wool sleeve 175 in FIG. 7 is next caught and transferred to a curing apparatus as shown in FIG. 8. The double conveyor chain therefore moves past a couple of pulley wheels 179 returning along the lower part of the chain where the catchers 180, 181 and so on carry empty mandrels. The pulley wheel 179 is driven by means of a belt disc 182, a belt 183 and a motor 184. In a way to be described in greater detail below in connection with FIG. 8 the motor will get a starting impulse from the conduit 156', and from a conductor 156", dependent thereupon, which runs to a relay 185, which is consequently magnetized when current is momentarily fed to the conductor 156'. When the relay 185 is magnetized, it immediately closes its contact 186 which causes the motor 184 to start. Simultaneously the contact 187 is closed, transmitting current through a limit position switch 188 to the conductor 156". The limit position switch 188, provided at the side of the return part of the double conveyor chain 116, is opened by the catchers when they pass the switch and continuously closed between the times when a catcher passes over the switch 188.

In the position of the conveyor shown in FIG. 7 the switch 188 is opened by catcher 180. Now for a short time the conductor 156" will get current dependent upon the conductor 156', in a way which will be explained below, and as a consequence thereof the motor 184 will start running, and the catcher 180 will be removed from the immediate vicinity of the switch 188 so that it will also close. The relay 185 has in the meantime also closed its contact 187, and when the conductor 156" one moment later will again be free of current, the relay 185 will remain attracted over a circuit including contact 187 and the limit position switch 188, until 188 is opened by a new catcher coming into its working zone. Only thereby will the motor 184 stop.

By this arrangement it is provided, that at any time the motor will move only so far as required in order that the double conveyor chain 116 shall be moved one step, and further that it stops in exact positions, and finally, that the time of the intermittent function of the double conveyor chain 116 will be directly dependent upon the current pulses in the conductor 156' and thus indirectly determined by the time intervals at which the switch 112 is closed and opened. Thus, this part of the system works in synchronism.

The connection between the conductors 156' and 156" will be evident following discussion of the curing operation in connection with FIG. 8 of the drawings.

It was noted earlier that the mineral wool, from which the sleeves were produced, was sprayed with a curing plastic in solution. This curing plastic should be a solvable thermo-curing plastic, which can be sprayed on the mineral wool in fluid form. In order for the pipe shells to retain their form, and be sufficiently stiff, the plastic must now be cured. This is done after the solution has been driven off, suitably under a given pressure, so that such defects as to the form, which may possibly have occurred during the rolling, will be eliminated, and the pipe shells will be concentrical with the mandrel.

The curing apparatus contains as its essential parts two wheels 190 and an intermediate shaft 218, rigidly connected to the wheels. Thereover a cup is placed (not shown), to ease the suction of the steam formed during the curing procedure. The wheels 190 are intermittently driven in the direction of the arrow 191 by means of a belt 192, which is, in turn, driven by a motor 194. The motor 194 gets its currents through a contact 195 on a relay 196 which is attracted due to current in the conductor 156'. The impulse of current over this conductor, however, lasts only a short time. Thus, in order for the motor to operate for the required time interval, the relay 196 is arranged to be self-holding over a contact 197 in series with a limit position switch 198, which is manipulated by the curing apparatus during its rotation.

The apparatus heretofore described operates in the following manner.

When the impulse enters the conductor 156', the relay 196 is immediately attracted and closes its two contacts 195 and 197 as well as a third contact, the purpose of which will be evident from the following. Over the contact 195 the motor 194 is started, and the curing apparatus 190 starts rotating. Over the contact 197, the relay 196 will be self held in series with a limit position switch 198. When the curing drum has rotated one step, which in the present case (seven curing places) is identical with one seventh of a turn, the limit position switch is opened, and thereby also the self-binding circuit of the relay 196 is opened, so that this relay is released, and the motor 194 stops. A curing station with a completely cured pipe then has advanced to the unloading position, which is the lowermost position in the figure, and an uncured pipe shell has advanced to the first curing position which is indicated by the numeral 199 in FIG. 8. The ready-cured pipe shell 200 is then removed in order to open a station for a non-cured pipe shell, as soon as one is available on the double chain conveyor 116.

The contact 201 on the relay 196 is provided for loading the uncured shell onto the curing apparatus. A magnetization circuit for an auxiliary relay 202 is closed over contact 201, relay 196 immediately closes its contact 203 thereby sending current to the magnet 204, which influences its armature to reverse the valve 205 to the servo motor 206, so that the lower pressure chamber of the servo motor 206 will be connected to the pressure conduit. The servo motor thereby causes turning of an arm 207 in a counter clockwise direction. The arm 207 is provided with hooks 208 for carrying the ready cured pipe shell 200 by the ends of its mandrel. The arm 207 is lifted up into such a position that the pipe shell will be carried up to the curing apparatus by the arm 207. In this position a rigid recess 211 in the curing apparatus will contact the contact spring 212 on the arm with the consequence that the contact will be opened. This contact, however, is contained in series with a self-binding circuit for the relay 202 over the proper contact 213 of said relay, and consequently the relay 202 will be released, and immediately thereafter the magnet 204 will be de-magnetized. The valve 205 will then return to its normal position, and pressure air will be fed to the upper chamber in the servo motor 206 so that the arm 207 will be lowered to unload the cured pipe shell onto the double conveyor band 116. The arm 207 then closes a contact 214, which will close a circuit through the conductor 156". As discussed earlier this causes the double transport conveyor 116 to be moved forwardly one step.

A new, not yet cured mineral wool pipe shell, will then roll or be transported forwardly to the claw 208 on the arm 207, from which it will be raised into position to be cured in the downwardly turned curing station now prepared to receive it. For this purpose a contact 215 is arranged to be closed when the new pipe shell has arrived at the position in the hook 208 on the arm 207. The contact 215 closes positive voltage to the winding of the relay 202 which is now again attracted and becomes self-binding and puts the servo motor 206 into operation so that the non-cured pipe shell is raised into the empty curing station. The pipe shell will wait in this curing station until a new pulse enters from the conduit 156' thereby causing the curing apparatus to be turned one step, and another ready cured pipe shell will be moved into position to be unloaded.

The curing apparatus operates in the following manner. By a conduit 216 hot gases, for instance smoke gases from an oil burner, are pumped into the bearing standard 217 and from this into a hollow shaft 218, about which the curing apparatus turns. In the interior of this shaft a fixed sleeve is provided, in which there are arranged a number of holes, corresponding to the spokes 219 to the curing stations other than the laoding or unloading station. The sleeve thus is only provided with six openings, whereas there are seven curing stations. Hot gases are conducted through the said openings into the spokes 219 and through openings 220 into the interior of the mandrels 221. The mandrels are provided with a great number of small perforations allowing the gas to travel outwardly into the mineral wool mass of the pipe shell in radial direction, heating the plastic solution existing therein, so that the solution means is evaporated and the plastic is cured. In this way the pipe shells will be ready cured when they finally come into the unloading position.

It will be seen from FIGS. 7 and 8 that the ready cured pipe shells are unloaded by the chain conveyor at the left of the re-directioning pulley wheel 179, FIG. 7. The shells thereby fall down on a roller path 230 on which they roll by their weight to the next station in the chain of operations where, by grinding, the outer surface of the cured pipe shells are adjusted. Grinding is necessary because the outer surface carries defects of size occurring both from the winding procedure and from the curing apparatus. For many practical purposes it is essential that the periphery of the pipe shells be concentrical with the inner openings: for instance when the shells are employed as insulating pipes without any further dressing being applied to the insulation. In order that the joints between the different pipe shells shall be as invisible as possible exact measurements in general and in concentricity in particular are required. Even in the cases where one is using as few standard dimensions as possible, as where one builds up pipe installations by adding pipe shells outwardly onto each other, a high degree of exactness of measurement and concentricity are required. It has proved impossible, in the winding apparatus and the curing apparatus to obtain shells of exact measurement. For several reasons, especially for economic reasons, it is important that the need for grinding should be kept at a minimum. In a system according to the present invention the need for grinding will, although inevitable, be a minimum.

Some uniformity of the pipe shell dimensions can be provided by the curing apparatus by enclosing the pipe shell, during the curing, with the outer perforated mold concentric with the mandrel. This mold is not shown in the present application because it is not essential to the invention.

Figure 9:
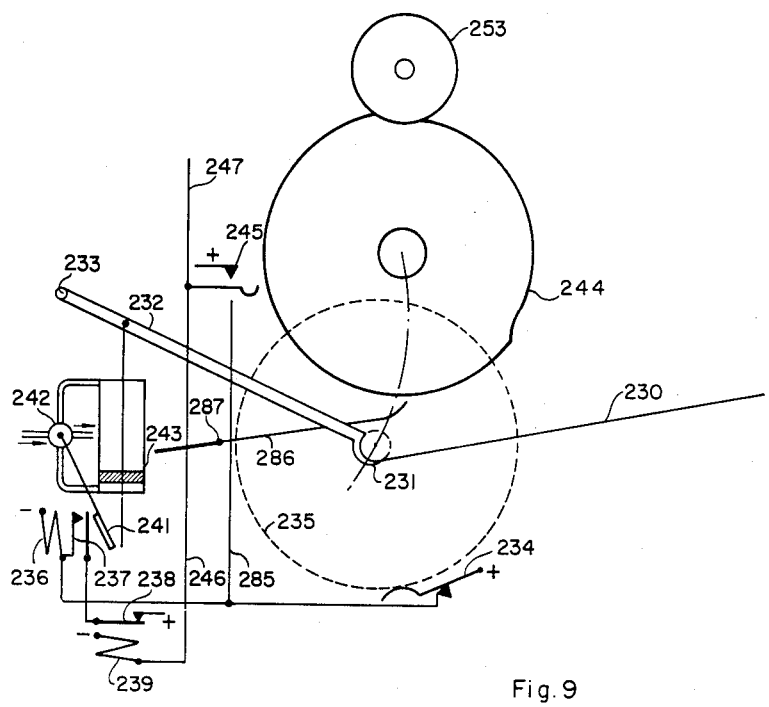
FIG. 9 is an end view of the grinding apparatus for post-adjustment of the outer cylindrical surface of the mineral wool pipe shell.

The device for lifting the pipes to the grinding position are shown in FIG. 9. In this figure the left part of the roller path 230 is shown and it is further assumed that the extending ends of the mandrel, carrying the pipe shell, roll on path 230 so that the shell will fall into the hook 231 on an arm 232, which is turnable about a shaft 233. A contact spring 234 is so arranged that it is influenced by the pipe shell when the shell enters into position 235 marked in the figure by dotted lines, so that a circuit is closed to a relay 236, which, in a manner discussed earlier will be self-holding and remain attracted until the self-holding circuit is opened.

The contact 237 of the relay is attracted and feeds positive voltage over the contact 238 on the self-holding release relay 239 to the winding 236 for the self-holding. Simultaneously with the relay being magnetized its armature 241 is attracted, whereby the valve 242 is turned over, so that pressure medium is fed to the lower chamber in the servo motor 243. This then lifts the arm 232 together with the shell up into the position of shell 244 where the shell is retained by means which will be described in connection with FIG. 10. Simultaneously with the shell coming up into the position of shell 244, a limit position contact 245 is closed by contacting the arm 232. This limit position contact causes two different functions, magnetization of the relay 239 over the conductor 246 and retention of the shell in position 244 by current through conductor 247 in a way which will be described in connection with FIG. 10. When the relay 239 is attracted it opens its non-magnetized closed contact 238, and the self-holding for the relay 236 is released, so that this relay will be de-magnetized. Thereby, again by means of the armature 241, the valve 242 will be turned over and the upper chamber of the servo motor 243 will be fed with pressure medium so that the arm 232 will be returned to its lower position of rest.

Figure 10:
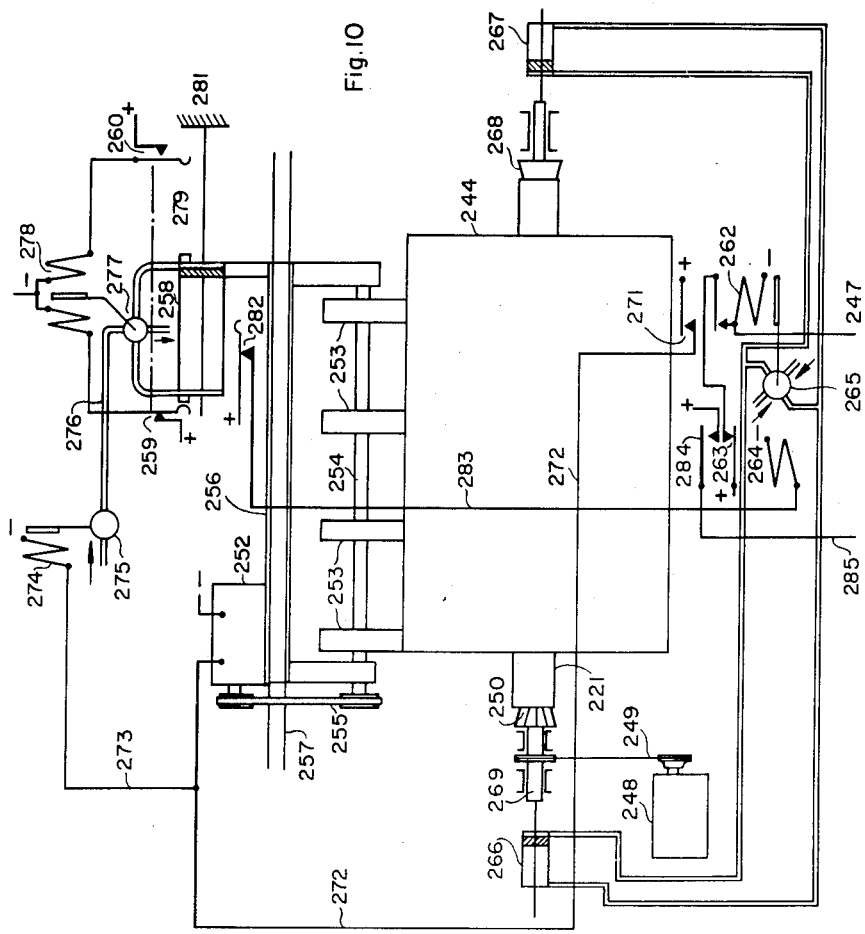
FIG. 10 is a side view of the grinding apparatus shown in FIG. 9 together with the electrical and pneumatic conduits required for its manipulation.

The grinding apparatus contains two motors; the motor 248, see FIG. 10, which is connected by means of a belt transmission to drive a rotating center bolt 250 provided with a span chuck which enters into the hollow mandrel 221 on the sleeve, and also the motor 252, which drives a number of grinding discs 253 having a peripheral speed higher than that of the pipe shell 244. The grinding discs 253 are arranged on a common shaft 254, which is rotated by the motor 252 by means of a belt transmission 255. The motor 252, the belt transmission 255, and the grinding discs 253 together with their common shaft 254 are arranged on a grinder car 256, which is displaceably provided on rails 257. For this displacement a pneumatic servo motor 258 is provided which closes limit position switches 259 and 260 at each end of its movement for reversal of the movement. The two switches 259, and 260 are mutually mechanically connected, so that the closing of the one will cause opening of the other and vice versa.

The arrangement operates in the following way. When the contact 245, see FIG. 9, is closed, voltage is fed over the conductor 247 to a relay 262, see FIG. 10, which is then attracted and closes a self-holding circuit over the contact 263 on the relay 264. Simultaneously the relay 262, by means of its armature, turns over the valve 265, so that pressure medium is fed to the outer chambers of the two servo motors 266 and 267. The pistons of the servo motors 266 and 267 are thereby displaced inwardly, so that the chuck 250 as well as the center cone 268 enter into each end of the hollow mandrel 221, where the chuck will nonrotatably connect the mandrel 221 with the mandrel 269, driven by the motor 248. Either motor 248 should be of a rather slowly running type, such as a cog gear motor, or the schematically shown belt transmission 249 should have a high exchange of transmission, thereby reducing the rotational speed, so that the pipe shell 244 only rotates with a rather low speed.

Simultaneously with the relay 262 being attracted, its contact 271 is closed. This gives current to the driving motor 252 of the grinder wheels 253 over conductor 272, so that said grinder wheels 253 start rotating with a high speed. The same contact 271 also closes a circuit 272–273 for a magnet 274, which, with its armature, influences the valve 275, so that a pressure medium is fed to the conduit 276 and thereby to the valve 277. In the end position shown in the drawing of the to and fro movable grinder car 256, the servo motor 258 has just closed the end position switch 259, and as a consequence thereof the valve 277 has by means of the magnet 278 provided with two windings, turned its armature over into such a position that pressure medium from the conduit 276 is fed to the right pressure chamber in the servo motor 258. The piston of servo motor 258 is connected to the foundation 281 of the machine by bar 279, and as a consequence thereof the piston bar will remain stationary while the servo motor 258 together with the grinder car 256 and the grinder motor 258 will move to the right as shown in the drawings. The grinder discs 253 rotate with a high speed simultaneously as the pipe shell 244 rotates with a low speed, preferably in a direction opposite to the direction of rotation of the grinder discs 253, and simultaneously the grinder car is displaced to the right, so that grinding of the full cylindrical outer surface of the pipe shell 244 will take place. After the grinder car 256 arrived at the position at the far right as shown in the drawing the contact 260 is closed simultaneously as the contact 259 is opened. Consequently the valve 277 is turned over and a pressure medium is now fed to the opposite pressure chamber of the servo motor 258, so that the grinder 256 will move back to its initial position as shown in the drawings, still grinding the pipe shell 244.

It should be observed that in order for synchronism to be maintained dependent upon the sensing at the contact 112, see FIGS. 3, 4, and 5, all of the grinder apparatus should be of such a kind that it works at an essentially higher speed than the winding apparatus.

Above the grinder apparatus there is provided a hood having suction means (not shown in the drawing) through which the grinding residue is removed from the grinder apparatus.

When the grinder car 256 has arrived at the just indicated position, a contact 282 momentarily is closed and this magnetizes the self holding release relay 264, so that this relay is attracted over circuit 283 and opens the self-holding circuit for the relay 262, which thereby is released. When the relay 262 is released the two circuits 272 and 273 are opened, so that the current to motor 252 will stop, and the valve 275 will cut off the further feed of pressure medium to the servo motor 258.

The unloading of the ready ground sleeve takes place in the following manner. The self-holding release relay 264 is provided with a contact 284, which closes positive voltage to a conductor 285 leading to the relay 236, see FIG. 9. The contact 284 is thus connected in parallel to the contact 234. As a consequence thereof a procedure commences for unloading the ready ground pipe shell which is exactly reverse of the procedure for loading the unground pipe shell as described above in connection with FIG. 9. Now, however, the arm 232 is lifted rather rapidly, because it is not loaded with a pipe shell during the lifting movement, and its claw 231 therefore has sufficient time to grip around the protruding end of the mandrel 221 before the chuck 250 or the center bolt 268 has been removed therefrom. The de-magnetization of the relay 262 in its turn causes the armature of this relay to move back and turn over the valve 265, allowing pressure air to be fed to the conduits which run to the inner chambers of the servo motors 266 and 267, so that these move the center bolt 268 out of the mandrel and release the chuck 259 from its engagement with the protruding end of mandrel 221, respectively.

During the lowering movement the extending ends of the mandrel 221 are caught by a couple of rails 286, the ends of which are guided at 287 to avoid blocking of the pipe shell during its upward movement into grinding position, but catching the pipe shell during its downward movement, so that it will thereafter roll on to the next step of treatment on the rails 286.

The next step following in the full automatic production of the pipe shells according to the invention consists of a treatment of the ground surface to make it rather durable and free of residue. The surface treatment takes place in a station similar to the one in which the grinding took place. Instead of the grinding discs, however, there are applied above the pipe shell a series of nozzles, by which a surface binding means is fed to the outer mantle surface of the pipe shell. The binding means may also be applied in another way. The way in which the binding means is applied is not essential to the invention.

Hereafter a drying of the binding means should take place. In the next following station, which also has the same general appearance as the grinding apparatus described in FIGS. 9 and 10, but in which there are, of course, no grinding discs or control means therefor, a first drying of the surface binding means takes place, either by introducing hot air into one or both of the shaft ends, carrying up the mandrel during its movement of rotation, or by the outer surface of the pipe shell being radiated by heat during rotation. Possibly both of these methods could be mutually combined.

During much of the treatment up to this moment, including the curing, the grinding, the spraying of binding means and the preparatory drying, the pipe shell has been heated rather strongly. It will therefore now be necessary in a separate step to cool the pipe shells. The apparatus for cooling the pipe shells is generally the same kind as that for curing the pipe shells, as described in connection with FIG. 8. However, of course, a gas cool medium, for instance cold air, should be fed through the pipe 216. One may employ a separate intermediate wall to divide the sleeve 222, inside of the shaft 218, into two parts, whereafter hot air is fed through a pipe 216 to one part and cold air through a second corresponding pipe to the other part. Of the six openings in the sleeve 222, mentioned in connection with FIG. 8 some should then correspond to the first positions after loading. For instance the two first positions may be connected to the hot air side of the sleeve 222, so that hot air will stream out through the spokes 219 to the mandrel 220 and further out through the pipe shells 199, so that a complete drying of the surface binding means is ensured. The remaining openings in the sleeve 222, that is, under the assumption made above, the four last mentioned openings would then be connected to the cold air side of the sleeve, and through these openings, cold air could stream through the spokes 219 to the mandrel 220 and further to the pipe shells 199, so that the temperature of the pipe shells could be lowered so that they may thereafter be more easily handled and packed.

After the pipe shell has in this way been cooled and removed from the cooling apparatus, the mandrel with the pipe shell mounted thereon is transported intermittently in a manner as earlier described with respect to the apparatus of FIG. 8 to the station following next thereafter, where the mandrel is drawn out from the pipe shell. The shell has by now become so rigid, that it need no longer be supported by the mandrel. Further treatments, including sawing up of the pipe shell into a suitable number of sectors, are then performed with the mandrel removed.

It will be recalled that the mandrel, at least in its outermost part, is hollow so that, for instance during the grinding procedure according to FIG. 10, a chuck could be introduced into the mandrel. Drawing the mandrel out from the sleeve also place by means of a chuck which is introduced into the hollow shaft, see FIG. 12.

In FIG. 8 it was assumed that the pipe shell, after having been cured, moved on, rolling on a path 116. After the optional cooling step, the pipe shell, which has meantime also been ground and surface treated, will pass on a similar path 290, FIG. 11, which carries the pipe shell 244 by means of the extending ends of the mandrel 221. The path 290 guides the pipe shell 244 in between a couple of fixed shields 291, 292, see also FIG. 12, in which grooves 293 are provided for receiving the ends of the mandrel 221. For braking the rolling movement of the pipe shell 244 the path 290 is suitably bent upwardly in the vicinity of the end of the grooves, as seen at 294 in FIG. 11. In connection with the shields 292 a sensing contact 295 is provided for indicating the pressure of a pipe shell 244 in between the shields 291 and 292 in a position for removal of the mandrel. The marking contact 295 is, by means of a conductor 296 connected to the coil of a relay 297, which over its contact 298 and the conductor 299 feeds current to a reversible cog gear motor 300. This motor is provided with a belt transmission 301 for driving a car 302 on a couple of rails 303. The car 302 carries a servo motor 304 and a spanning chuck 305 controlled by the servo motor and arranged in such a way that it will, upon displacement in a rightward direction in FIG. 12, enter into the hollow part of the end of the mandrel 221, visible at left in this figure.

Figure 12:
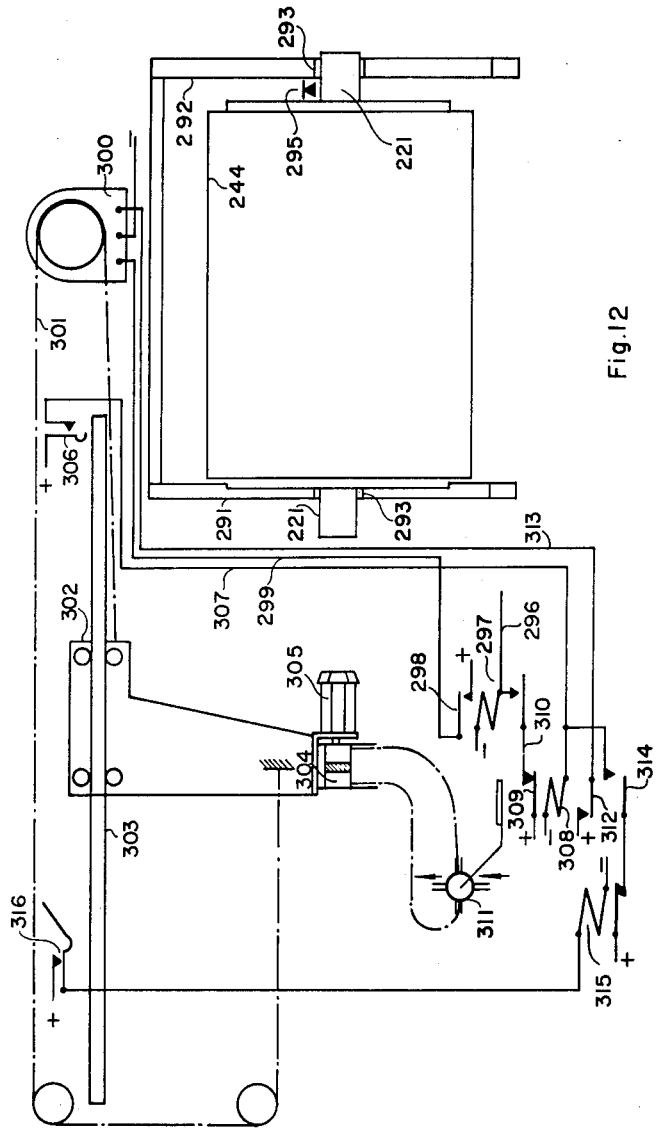
FIG. 12 is a side view of the apparatus shown in FIG. 11.

A contact 306 is arranged in such a way that it is influenced by the car 302, when it comes into its position at the right as shown in FIG. 12 to close a circuit 307 to the coil of a relay 308, which, over its non-magnetized closed contact 309, will keep the self-holding circuit 310 of the relay 297 closed as long as the relay 308 is not magnetized. Further, the coil of the relay 308 serves as turning magnet for an armature which controls the valve 311 of the servo motor 304, so that the chuck 305 will move outwardly and enter into the interior of the left end of the mandrel 221. The relay 308 is further provided with a contact 312, by means of which a circuit 313 is closed to the winding of the reversible motor 300 causing reversed direction of movement of this motor, and also with a contact 314, by means of which the relay 308 will obtain self-holding under control of a relay 315. The last mentioned relay is magnetized over a contact 316, which is momentarily closed when the car 302 arrives at its position of rest at the left.

The apparatus now described operates in the following manner.

Figure 11:
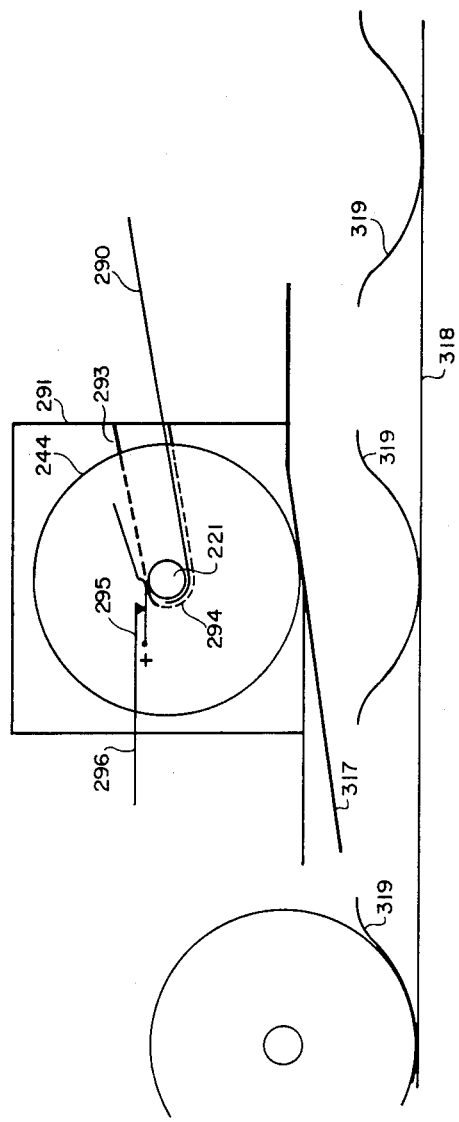
FIG. 11 is an end view of the apparatus for removing the mandrel from the finished ready made mineral wool pipe shell.

When a pipe shell with the mandrel still inside of it approaches the mandrel removing apparatus on the path 290, FIG. 11, its movement is stopped by the hook 294 and simultaneously the contact 295 is closed, sensing that a pipe shell is present. The closing of the contact 295 causes magnetization of the relay 297, and as a consequence thereof this relay becomes self-holding and closes the circuit for the motor 300 which starts moving in such a direction that the car 302 will be brought to the right in FIG. 12. When the car has arrived into its right end position, in which the chuck 305 has entered into the interior of the mandrel 221, the contact 306 is closed and as a consequence thereof the relay 308 is magnetized. This relay, at the contact 309, opens the self-holding circuit of the relay 297 which will immediately be demagnetized, so that the motor 300 stops. Further, the relay 308 will be self-holding by means of a contact on the relay 315, which is non-magnetized, and finally it will turn over the valve 311, so that the motor 304 will start operating to move the chuck 305 into engagement with the end of the mandrel 221. Finally the relay 308 closes a working circuit 313 for the motor 300 over the contact 312 so that the motor starts moving in the opposite direction and, by means of the car 302, brings the chuck 305 together with the mandrel 221 to the left in FIG. 12. The pipe shell 244 does not follow this leftward movement since it is retained by the shield 291, and consequently the mandrel is drawn out from the pipe shell. The drawing out movement continues until the mandrel is fully out from the pipe shell 244, whereby the car 302 provides closing of the contact 316, and the relay 315 is magnetized. This relay, 315 opens the self-holding circuit for the relay 308, which is immediately released. It then opens the circuit of the motor 300 which stops in the far left position. The relay 308 further releases its armature, whereby the valve 311, by resilient spring force, moves back into its opposite position, whereby the chuck 305 releases the contact with the mandrel 221 and the mandrel falls down on a transport path which carries it back to the unloading wheel 118 in FIGS. 3–5 where the catchers on the double conveyor chain 116 catch one empty mandrel for each intermittent movement in the direction of the arrow 121, the mandrel thereafter being reused for winding of the mineral wool mat 50 according to what has been described above.

As soon as the pipe shell 244 has been released from its mandrel it is no longer retained between the shields 291 and 292, and it will therefore roll by its weight onto a path 317, FIG. 11, down to a new double conveyor chain 318, which is provided with cradles 319 resting between the chains. These cradles carry the pipe shells further past two band saws, which, during the intermittent movement, cut the pipe shell resting in the cradle 319 to the correct length. The cradle conveyor now carries the cut pipe shell to the final station, where slitting into sectors takes place.

Normally pipe shells are available in the market which are slit in one single place along their periphery, by means of a slot which runs in the axial direction, whereby they can without any difficulty, be opened and mounted around the pipe to be insulated and thereafter again be closed. However, pipe shells, especially such pipe shells which have a big inner diameter, require a great packaging space relative to the effective volume of the insulation material. Transportation and packing economics have required that certain types of pipe shells be manufactured in the form of pipe shell half parts, that is, sectors of 180°, which are slit up by two cuts. For especially big pipe shells it may even be more practical to slit them by means of three cuts, so that they form three sectors of 120° each.

Figure 13:
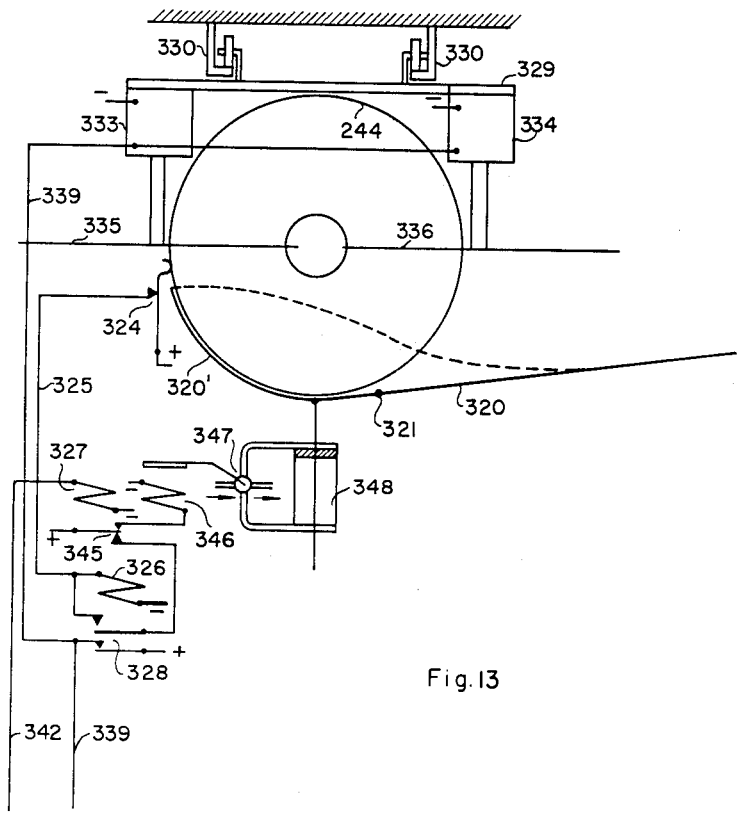

The conveyor 318 now carries the pipe shell past the end cutting station and to a roller path 320, which runs down to the sawing device according to FIG. 13, where the slitting will take place. The roller path 320 there ends with a bent part 320' which, by means of a guide 321 is turnable downwardly to a release position in a manner which will be further described below. The path 320 is further provided with guide side pieces 322, 323, see FIG. 14, which adapt the ready made pipe shell 244 into the exact position for sawing. In the case indicated in FIGS. 13 and 14 it is assumed that the pipe shell shall be divided into two parts, each comprising part of the circumference of the sleeve equal to 180°. But it is obvious to the man skilled in the art that this apparatus can easily be modified to divide the pipe shell into some other number of cuts, for instance one or three cuts, in the latter case the cuts forming three sectors, each comprising 120° of the circumference.

The pipe shell is arranged, as it rolls down into sawing position, as shown in FIGS. 13 and 14, to influence a switch 324 starting the sawing procedure. Over the circuit 325 the switch 324 closes current to a relay 326, with a self-holding circuit running over a contact 345 on the relay 327. Further the relay 326 is provided with a second contact 328, which is arranged to start the sawing procedure.

For the sawing operation a car 329 is arranged to run on wheels on a couple of rails. The car is driven by a feeder motor 331 by means of a wire transmission 332, see FIG. 14. The car 329 further carries two saw motors 333 and 334, each provided with one circular saw blade 335, 336. One can, of course, instead of using circular saw blades 335 and 336, use one single or possibly a plurality of band saw blades. The man skilled in the art will immediately understand how to provide this modification. All three motors 331, 333 and 334 are, by means of conductors 339, connected to the contact 328, so that they start immediately when this contact is closed. The car 329 is further arranged so that it will provide at its two outer positions the reversal of contact 338, which will thereafter remain in the assumed position, until the car 329 has arrived into its outermost position. The contacts may, for instance, be arranged in the same way as the two end position contacts 259 and 260, shown in connection with FIG. 10. They are combined in such a way with a branch of the circuit 339 running to the reversible feeder motor 331, that in the one position of the contact 338 the feeder motor 331 will work in the one direction, and in the opposite position of the contact 338 the feeder motor 331 will work in the opposite direction. Further, in the two limit positions of the movement of the car 329, the usual limit position switches 340 and 341 are provided. These two limit switches are connected in parallel to a conductor 342, running to the winding of the relay 327, FIG. 13.

The apparatus described above operates in the following manner.

When a pipe shell to be slit arrives at path 320 into the sawing position along the path 320, it is sensed by the bent end plate 320'. The contact 324 is then closed and the relay 326 is magnetized and attracted. The relay will then immediately close a self-holding circuit over a non-magnetized closed contact on the relay 327, and further will close the contact 328, which over the conductor 339, feeds current to the motors 333 and 334 as well as to the feeder motor 331. Consequently these motors will immediately start rotating, whereby the feeder motor 331 will rotate in the direction determined by the latest setting of the contact 338. If at this moment the apparatus is in the position shown in FIG. 14, then the car 329 will move upwardly in the figure, simultaneously as the pipe shell 244 is sawed. When the car 329, after sawing of the pipe shell, which in this case means dividing it into two half parts of pipe shells, arrives at its other end position contact 341 is closed simultaneously as contact 338 is reversed. By closing the contact 341 the relay 327, FIG. 13, is magnetized. This will thereby open the self-holding circuit for the relay 326, which will then open the circuits for the motors 331, 333 and 334, so that they will stop. By the reversal of the contact 338, the car 329 is prepared for movement in the opposite direction for sawing the next pipe shell 244, entering into sawing position.

For removing the two thus ready made half parts of pipe shells from the bent plate 320' in the path 320, the contact 345 of the relay 327 is arranged at this moment to close a circuit for the magnet 346 to a valve 347. This turns over the pressure medium circuit to a pneumatic servo motor 348, which, during its movement, turns down the bent plate 320' around its guide 321, so that the pocket, in which the sawing of the sleeve was made, is opened.

Hereafter the two half parts of the pipe shell may be removed by hand or in other suitable way.

To briefly recapitulate the overall operation of the invention, the apparatus includes at least the following stations: a bale feeding station, a bale cutting station, a shell winding station, a shell curing station, a shell grinding station, a mandrel removing station, and a shell slitting station. Between the grinding and the mandrel removing stations the pipe shells may also pass through a treatment (binding) station, a drying station and a cooling station.

It is important to understand that the operation of every station in the apparatus is controlled either directly or indirectly by a switch 112, located in the third station (winding station) which closes when a wound pipe shell reaches a given thickness. The electrical pneumatic system through which switch 112 controls the apparatus is shown in detail in FIG. 6. All of the effects of closing switch 112 can be placed into three broad categories: (1) control of stations prior to winding station to stop feeding of the mineral wool mat 50 to the winding station, (2) transferring the fully wound mineral wool pipe shell on mandrel 77 from the arm 76 of the winding station (by means of an arm 101) to a conveyor 116 for transporting the shell to further treatment stations, (3) causing all of the pipe shells in all of the further treatment stations to move up one step.

Considering first those stations prior to the winding station, the bale feeding and cutting stations, refer to FIGS. 1 and 2. Bales are transferred up the conveyor 10, onto arm 17 and cut by blade 20 after which a continuous mat 50, cut from the bale mounted on arm 17, is carried by a conveyor belt 44 to the winding station (the mat moves from right to left in FIG. 2). The belt 44 is visible at the right hand side of FIGS. 3, 4, 5 and 5A. A new bale is fed from conveyor 10 to arm 17 whenever the previous bale has been consumed (that is, completely cut to form mat 50). However cutting of the bale to form the mat occurs only when the belt 44 is moving since the belt 44 itself turns the bale which is being cut. Belt 44 is operated through a belt 74 by a motor 70. As shown in FIG. 6 motor 70 is controlled by the switch 112. Thus, indirectly, the bale feeding and cutting stations are controlled by switch 112.

Closing the switch 112 stops the feeding of mineral wool mat 50 in the following manner. One result of closing switch 112 is to disengage a clutch at motor 70 and thereby cause belt 44 to stop delivering mat 50 to the winding apparatus. Another result of closing contact 112 (see upper left portion of FIG. 6) is to actuate an armature 127 which causes a valve 128 to pass high pressure fluid to the upper portion of a servo motor 115. This in turn causes a piston in servo motor 115 to be moved downwardly. Referring to FIGS. 3–5A this causes a teeth-arm 114 to move downwardly into the mat 50 to cut it. Compare the position of the lower end of teeth-arm 114 in FIGS. 3–5. In FIG. 3 the arm is raised and mat 50 moves beneath it. In FIG. 4 the arm 114 initially engages mat 50 just as the belt 44 is coming to a halt. In FIG. 5 the belt has stopped and 114 has effectively cut the mat 50 so that the shell 99 may be carried away. When mat 50 is fed to the winding station it is wound around a mandrel 77. Initially the mandrel 77 is positioned to receive the mat 50 coming from belt 44 and the switch 112 is open. The teeth-arm 114 is raised so as not to interfere with the flow of mat along belt 44 to mandrel 77. Mineral wool is then wound on to the mandrel until the desired thickness of mineral wool is attained. Compare the position of elements 77 and 112 in FIG. 3 with the positions of those elements in FIG. 5. In FIG. 3 where the winding is just starting, 77 is to the right and the two contacts of switch 112 are separated. In FIG. 5 the mandrel 77 is pushed farther to the left and the large mineral wool pipe shell formed on 77 has caused the two contacts of switch 112 to close.

The second main category of effects caused by the closing of switch 112 is the transferring of the fully wound mineral wool pipe shell loaded on the mandrel 77 from the arm 76 of the winding station (by means of arm 101) to the conveyor 116 for transporting the shell to further treatment stations. The procedure for carrying out this transfer is discussed in detail above and illustrated in FIGS. 5 and 5A. The electrical pneumatic system causing this result is shown in FIG. 6.

The third category of effects caused by closing the switch 112 is transferring the pipe shells located in further treatment stations through the apparatus. The operations of each of the further treatment stations have been discussed above in detail. Conveyors transfer the material from each of the further stations to the next station. Every pipe shell that has moved past the winding station but has not left the overall apparatus will be located at a step in any one of the further treatment stations or at a step on a conveyor between further treatment stations. As discussed above in detail with reference to FIG. 6, every time the switch 112 closes, every pipe shell located beyond the winding station either in a further treatment station or on a conveyor between further treatment stations will move one step along the conveyor or through a treatment station depending on the location of the pipe shell.

The invention, of course, is not limited to the specific arrangement shown in the drawings and described in the above, but includes all modifications which may occur within the frame of the invention. For instance to a great extent electrical relay control circuits have been shown to be used for controlling the different operations. However, it is obvious, that one may with the same advantages and results employ, pneumatical, mechanical or optical arrangements for the same purpose. The present limit position contacts may be replaced by photocells influenced by rays of light responsive to by the way which the pipe shell or other occurring means enter, and so on. The curing may take place in some manner other than in a rotating curing apparatus with seven curing places, and also cooling may be executed in another way. The grinding apparatus need not necessarily have just the number of grinding wheels shown in the drawing, and one need not necessarily let the grinding apparatus pass to and fro above the pipe shell. These different possibilities of modifying the arrangement within the frame of the invention have only been mentioned as chosen examples.

What we claim is:

1. An apparatus for the production of pipe insulating shells from mineral wool which has been impregnated with an uncured plastic, said apparatus comprising: a winding station; wool feeding means for feeding wool to the said winding station; said winding station including a removable mandrel about which the wood is wound to form a wool shell; pivotally mounted support means for rotatably supporting said mandrel during winding; thickness indicating means for indicating the thickness of the said wool shell wound around said mandrel; means for stopping the wool feeding means; cutting means for severing the wool fed to said winding station; said means for stopping and said cutting means being operable in response to the thickness indicating means indicating a preselected thickness of said wool shell; mandrel transfer means for transferring said mandrel after it has been wound with wool to form a shell, said transfer means being operable in response to the said thickness indicating means indicating preselected thickness of said wool shell; a plurality of treatment stations in addition to the said welding station; conveying means for conveying said mandrel and shell from said winding station to the said additional treatment stations, said conveying means being operable in response to the said thickness indicating means indicating a preselected thickness of said wool shell; and a mandrel replacement means for placing an empty mandrel in the support means upon the transfer of said mandrel wound with a wool shell from said winding station.

2. Apparatus as claimed in claim 1 in which the thickness indicating means comprises an electrical switch having a feeler arm which contacts the circumferences of said shell.

3. Apparatus as claimed in claim 1 in which the mandrel and shell transferring means comprises a pair of rotatable arms, pneumatic servo motor for driving said arms, and electromagnetic grasping means on one end of said arms for grasping the protruding ends of said mandrel.

4. Apparatus as claimed in claim 1 in which said mandrel and shell conveying means comprises an intermittently movable double conveyor chain having corresponding protruding catchers for catching both protruding ends of said removed mandrel, said catchers being spaced equal distances apart on each chain.

5. Apparatus as claimed in claim 4 having a limit position switch for stopping said conveyor chain after it has moved a distance equal to that between the catchers on one chain.

6. Apparatus as claimed in claim 3 having means for conveying empty mandrels into a selected position relative to said mandrel and shell transferring means so that said transferring means grasps an empty mandrel after release of the full mandrel, whereupon said servo motor returns said rotatable arms to allow said empty mandrel to be placed in said mandrel support means.

7. Apparatus as claimed in claim 4 having lifting means for lifting said mandrel and shell from said conveyor chain to at least one of said additional treatment stations, said means comprising at least two lifter arms each having electromagnetic catching means on one end.

8. Apparatus as claimed in claim 1 in which one of said additional treatment stations comprises a curing station for curing the plastic contained in the mineral wool.

9. Apparatus as claimed in claim 8 having a grinding station following the curing station and comprising means for grinding and cooling the outer circumference of said shell.

10. Apparatus as claimed in claim 9 in which a work station following the grinding station is a mandrel removing station and comprises means for driving the mandrel out of the cured shell.

11. Apparatus according to claim 10, having a sawing station following the grinding station and having saw means for dividing the shell into sectors.

References Cited by the Examiner

UNITED STATES PATENTS

| | | | |
|---|---|---|---|
| 2,019,417 | 10/1935 | King | 156—31 |
| 2,331,146 | 10/1943 | Slayter | 156—62.2 X |
| 2,503,041 | 4/1950 | Greene | 156—446 X |
| 2,621,736 | 12/1952 | Scruggs et al. | 242—56.6 |
| 2,742,240 | 4/1956 | Stephens et al. | 154—44 |
| 2,848,175 | 8/1958 | Stephens et al. | 154—44 |
| 2,927,742 | 3/1960 | Overman | 242—55.1 |
| 3,063,887 | 11/1962 | Labino | 156—446 XR |

EARL M. BERGERT, *Primary Examiner.*

P. DIER, *Assistant Examiner.*